US010768195B2

(12) United States Patent
Knapke

(10) Patent No.: US 10,768,195 B2
(45) Date of Patent: Sep. 8, 2020

(54) TWO-CHANNEL WHEEL SPEED SENSOR SYSTEM

(71) Applicant: Dana Heavy Vehicle Systems Group, LLC, Maumee, OH (US)

(72) Inventor: Brian V. Knapke, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 115 days.

(21) Appl. No.: 15/677,183

(22) Filed: Aug. 15, 2017

(65) Prior Publication Data

US 2018/0045749 A1    Feb. 15, 2018

Related U.S. Application Data

(60) Provisional application No. 62/374,982, filed on Aug. 15, 2016.

(51) Int. Cl.
*G01P 3/48* (2006.01)
*G01P 3/488* (2006.01)
(Continued)

(52) U.S. Cl.
CPC .............. *G01P 3/48* (2013.01); *B60T 8/171* (2013.01); *B60T 8/329* (2013.01); *G01P 3/36* (2013.01);
(Continued)

(58) Field of Classification Search
CPC .............. F16H 57/037; F16H 57/0483; F16H 2057/02043–02065; F16H 48/08;
(Continued)

(56) References Cited

U.S. PATENT DOCUMENTS 3,138,970 A * 6/1964 Costa .................... F16H 48/08
475/86
3,719,841 A * 3/1973 Ritsema .................. G01P 3/446
310/155

(Continued)

OTHER PUBLICATIONS

Muscle Car DIY, Factory Rear Axle Housing Performance Models (Year: 2015).*

(Continued)

*Primary Examiner* — David L Singer
(74) *Attorney, Agent, or Firm* — McCoy Russell LLP

(57) ABSTRACT

A wheel speed sensor system for determining the rotational speed of the wheels mounted at the opposite ends of an axle without requiring wheel speed sensor assemblies for each wheel shaft axle. As a result, the speed sensor system of the present disclosure can be housed in small sized or small capacity axle housing such as banjo type housings. In one embodiment, a wheel speed sensor assembly is positioned in the axle housing to determine the speed of one of the wheel axle shafts and a differential speed sensor assembly is positioned in the axle housing to determine the rotational speed of the differential. With these two speed measurements the rotational speed of the other wheel axle shaft can be calculated by a control unit. The wheel and differential speed sensor assemblies can each include a toothed or slotted ring or disk and sensor for sensing the teeth. In each of the wheel and differential speed sensor assemblies, one of the tone ring and sensor can be mounted for rotation with a wheel axle shaft and gear of the differential respectively and the other can be fixedly mounted. The sensors can detect the passage of teeth over time via the relative motion of the teeth and sensor to determine rotational speed.

13 Claims, 3 Drawing Sheets

(51) Int. Cl.
*G01P 3/487* (2006.01)
*G01P 3/36* (2006.01)
*B60T 8/171* (2006.01)
*B60T 8/32* (2006.01)
*B60T 7/12* (2006.01)
*B60B 35/16* (2006.01)

(52) U.S. Cl.
CPC .............. *G01P 3/487* (2013.01); *G01P 3/488* (2013.01); *B60B 35/16* (2013.01); *B60T 7/12* (2013.01); *B60T 2240/00* (2013.01); *B60W 2520/28* (2013.01); *B60Y 2400/3032* (2013.01); *Y10T 74/2188* (2015.01)

(58) Field of Classification Search
CPC .............. B60K 17/16–20; B21D 53/90; B60G 2206/30–32; B60G 2400/208; B60G 9/00–04; Y10S 180/905; Y10T 74/2188; Y10T 29/49893; F16C 2361/61; B60W 2510/104–1045; B60W 2510/28
USPC .................... 74/607; 73/115.08, 494; 29/463
See application file for complete search history.

(56) References Cited

U.S. PATENT DOCUMENTS

| | | | | |
|---|---|---|---|---|
| 3,769,533 | A * | 10/1973 | Pauwels | B60T 8/329 310/155 |
| 3,819,237 | A * | 6/1974 | Marouby | B60T 8/17613 303/171 |
| 3,949,841 | A * | 4/1976 | Jovick | B60T 8/329 188/181 R |
| 4,090,592 | A * | 5/1978 | Jovick | B60T 8/329 188/181 R |
| 4,953,670 | A | 9/1990 | Chemelewski | |
| 5,032,790 | A * | 7/1991 | Johnson | G01P 1/026 324/174 |
| 5,227,719 | A * | 7/1993 | Peterson | G01P 3/443 310/168 |
| 5,369,603 | A * | 11/1994 | Myers | G01D 3/02 702/104 |
| 5,486,757 | A * | 1/1996 | Easley | G01P 3/487 29/434 |
| 6,203,464 | B1 * | 3/2001 | Ishikawa | F16H 48/08 475/150 |
| 6,238,316 | B1 | 5/2001 | Sturm | |
| 6,394,246 | B1 | 5/2002 | Gassmann et al. | |
| 6,498,474 | B1 | 12/2002 | Turner | |
| 6,511,395 | B1 | 1/2003 | Irwin | |
| 6,609,649 | B1 * | 8/2003 | Barnholt | B21D 53/90 228/171 |
| 6,796,404 | B1 * | 9/2004 | Dick, Jr. | B60T 8/171 188/1.11 E |
| 7,115,058 | B2 * | 10/2006 | Duncan | B60K 1/00 475/5 |
| 8,167,762 | B2 | 5/2012 | Zink et al. | |
| 8,239,109 | B2 | 8/2012 | Dunn et al. | |
| 8,831,853 | B1 | 9/2014 | Barrowman et al. | |
| 9,222,530 | B2 | 12/2015 | Duraiswamy et al. | |
| 2003/0121319 | A1 * | 7/2003 | Kojima | B60C 23/061 73/146.2 |
| 2005/0070395 | A1 * | 3/2005 | DeGowske | F16H 48/08 475/230 |
| 2007/0049452 | A1 * | 3/2007 | Carter | F16H 48/08 475/220 |
| 2007/0149339 | A1 * | 6/2007 | Weith | F16H 57/0483 475/160 |
| 2007/0251319 | A1 * | 11/2007 | Campbell | G01P 1/026 73/488 |
| 2010/0272380 | A1 * | 10/2010 | Zink | B60T 8/171 384/448 |
| 2013/0069337 | A1 * | 3/2013 | Person | B60K 17/16 280/124.156 |
| 2015/0167750 | A1 | 6/2015 | Grogg et al. | |

OTHER PUBLICATIONS

CON MET, Service Manual for Steer, Drive & Trailer Hub Assemblies, pp. 12-13 (Year: 2013).*
Free ASE Study Guides, Passive and Active ABS Wheel Speed Sensor Function (Year: 2014).*
What-when-how, Rear Axle (Automobile) (Year: 2014).*
Spicer, Service Manual Spicer® Drive Axles AXSM-8810, Jan. 1998 (Year: 1998).*
Wayne Storr, Electronics Tutorial about Hall Effect Magnetic Sensor (Year: 2009).*

* cited by examiner

TWO-CHANNEL WHEEL SPEED SENSOR SYSTEM

CROSS-REFERENCE TO RELATED APPLICATION

This application claims the benefit of U.S. Provisional Application No. 62/374,982, filed Aug. 15, 2016 and incorporated in its entirety by reference herein.

BACKGROUND

This disclosure relates to wheel speed sensing systems and in particular to a sensing system that can determine the rotational speed of each wheel of an axle. More specifically, the disclosure is directed to an internally housed two-channel wheel speed sensor assembly for smaller sized axle housing that does not rely on speed sensor systems on each wheel axle shaft.

Vehicles typically include an axle assembly having a housing or case and a differential assembly. The housing includes a cavity into which the differential assembly is positioned. The differential assembly is mechanically coupled to the vehicle engine by an input drive shaft and is also coupled to the vehicle drive wheels via a pair of wheel axle shafts. The differential assembly regulates drive torque between the wheel axle shafts, thereby permitting the shafts to rotate at different velocities such as when one of the drive wheels is slipping or when the vehicle is turning.

Speed sensor assemblies for vehicles are used to monitor the rotational speed of the wheels for various purposes such as for implementing antilock or automatic braking system (ABS), traction control systems, and/or as input to an engine or transmission controller. A speed sensor can be employed to sense the rotational speed of a wheel or another component, such as the axle shaft, which has the rotational speed of the wheel.

Wheel speed sensors are often placed near the differential assembly or around the axle shaft and inside the differential housing or case to protect the speed assembly from exposure. Wheel speed sensor systems can be one-channel or two-channel systems depending on the number of speed sensors present. In one-channel systems, the wheel speed is determined by a single speed sensing the speed of the rotating differential ring gear or other rotating component of the differential which provides the an average speed of the two opposing wheels of the axle. Two-channel systems typically utilize two speed sensors, one for each wheel. Wheel speed sensors installed at the axle shaft ends can be positioned nearest to the wheels but this can result in exposing the speed sensor assembly to unfavorable condition which can impede their function and longevity.

One-channel wheel speed sensor systems are typically being used in axle assemblies with smaller sized axle housings since there is limited space to mount speed sensor assemblies on each wheel axle shaft. Typical smaller capacity axle housings are the so-called banjo-type housings which have gained popularity. Banjo-type housings have found use in medium and heavy duty vehicles. However, the average wheel speed outputted by one-channel wheel speed systems are of limited use to anti-lock and traction control systems that require knowing the rotational speed of each wheel or equivalently their respective wheel axle shaft to function properly.

SUMMARY

In one embodiment, a wheel speed sensor system for obtaining the speed of a wheel at each end of an axle can include, a differential mounted in an axle housing and having a gear set for transferring rotary motion from an input shaft to left and right wheel axle shafts for driving a wheel mounted on an end of each of the left and right wheel axle shafts. The system also includes a first speed sensor assembly that has a first slotted or toothed circular member and a first sensor. The first slotted or toothed circular member has equally spaced teeth or slots around an outer end of the first circular member and is mounted to one of the rotating gears of the differential gear set for rotation therewith. The first sensor is fixedly mounted at a position for sensing the passing of each of the teeth or slots of the first circular member and is connected to a control unit for recording the passing of each of the teeth or slots over time. The system also includes a second speed sensor assembly that has a second slotted or toothed circular member and second sensor. The second slotted or toothed circular member has equally spaced teeth or slots around an outer end of the second circular member and is mounted to one of the left and right wheel shaft axles for rotation therewith. The second sensor is fixedly mounted at position for sensing the passing of each of the teeth or slots of the second circular member and is connected to the control unit for recording the passing of each of the teeth or slots over time. The control unit uses the passing of each of the teeth or slots of the first circular member over time to calculate a speed of rotation of the one of the rotating gears of the differential and the passing of each of the teeth or slots of the second circular member over time to calculate the speed of rotation of the one of the left and right wheel axle shafts. The control unit calculates the speed of rotation of the other of the left and right wheel axle by multiplying the speed of rotation of the one of the rotating gears of the differential by two and subtracting the speed of rotation of one of the left and right wheel axle shafts. The speed of rotation of the left and right wheel shaft axles corresponds or is equal to the speed of rotation of the respective wheel mounted thereon.

In one embodiment, a method of determining the rotational speed of a first wheel mounted at one end of an axle and a second wheel mounted at an opposite end of the axle comprises attaching a first slotted or toothed metallic ring or disk to a rotatable portion of a first wheel axle shaft and positioned in an axle housing; attaching a first sensor to a stationary component and positioned adjacent the slotted or toothed portion of the first metallic ring or disk and in the axle housing. The first sensor is capable of sensing the passage of each of the slots or teeth of the first metallic ring or disk. The method also comprises attaching a second slotted or toothed metallic ring or disk to a gear of a differential gear set and positioned in the axle housing; attaching a second sensor to a stationary component and positioned adjacent to the slotted or toothed portion of the second metallic ring or disk and in the axle housing. The second sensor is capable of sensing the passage of each of the slots or teeth of the second metallic ring or disk. The method also comprises connecting the first and second sensors to a control unit for recording passage of slots or teeth of the first and second metallic ring or disk per unit of time to calculate a speed of rotation of the first wheel axle shaft referred to as FWS and a speed of rotation of the gear of the differential gear set referred to as SD; and calculating the speed of rotation of a second wheel axle shaft referred to as SWS according to the following formula: SWS=2SD−FWS, wherein the speed of rotation of the first wheel axle and the second wheel axle is equal to the speed of rotation of the first wheel and second wheel, respectively.

A two wheel speed sensor system for obtaining the rotational speed of a wheel mounted at an end of a left wheel axle and a wheel mounted at an end of a right wheel axle comprising a banjo-type housing enclosing a differential having a gear set, and portions of a left and right wheel axle shafts connected to the differential; a first speed sensor assembly having a first sensor and a ring or disk including teeth spaced about the perimeter of the ring or disk. One of the ring or disk and the first sensor is mounted on a gear of a differential gear set for rotation therewith and the other one of the ring or disk and the first sensor is fixedly mounted. The first sensor detects the passing of each of the teeth and is connected to a control unit that records output of the first sensor over time to calculate a speed of rotation of the gear of the differential gear set (DS). The system also comprises a second speed sensor assembly having a second sensor and ring or disk including teeth spaced about the perimeter of the ring or disk. One of the ring or disk and the second sensor is mounted on one of the wheel axle shafts for rotation therewith and the other one of the ring or disk and the second sensor is fixedly mounted. The second sensor detects the passing of each of the teeth and is connected to a control unit that records output of the second sensor over time to calculate a speed of rotation of one of the wheel axle shaft (FWS); wherein the control unit calculates a speed of rotation of the other one of wheel axle shafts (SWS) using the following formula: SWS=2DS−FWS, and wherein the speed of rotation of the wheel axle shafts is equal to the speed of the respective wheel.

DETAILED DESCRIPTION

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting.

This disclosure relates to a two-channel or two-wheel speed sensor system for smaller capacity axle housings that do not have sufficient space for a traditional two channel speed sensor assembly which includes a speed sensor assembly for each of the wheel axle shafts. Smaller sized axle housings have gained popularity for their compactness which can provide additional space for other vehicle components. Smaller axle housings also typically weigh less than their larger capacity counterparts. With average or larger sized axle housings, two-channel speed sensor assemblies consisting of a wheel speed sensor assembly for each wheel axle shaft to determine the respective wheel speed can be used. In smaller sized or smaller capacity axle housings such as banjo axle housings there is not sufficient space for wheel speed sensor assemblies for each wheel axle shaft at least while being housing inside the axle a housing. At best, there may be space only on one side to permit mounting a wheel speed sensor assembly on that wheel axle shaft.

Figure 1:
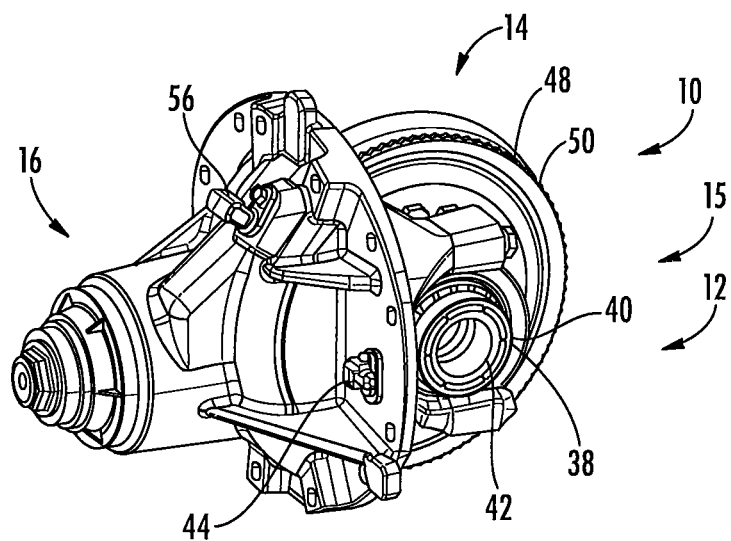
FIG. 1 shows perspective view of one embodiment of a cover portion of an axle housing and a differential having a wheel speed sensor system according to the present disclosure.

One embodiment of a two-channel wheel speed sensor system 10 for a small-sized axle housing is shown in FIG. 1. Sensory system 10 can include a wheel axle shaft/second speed sensor assembly 12 for determining the rotational speed of one wheel axle shaft and a wheel mounted thereon, and a differential/first speed sensor assembly 14 for determining the rotational speed of the differential 15 and specifically a driving gear of the differential 15. The two-channel wheel speed sensor system 10 can determine the rotational speed of the other wheel axle shaft and the wheel mounted thereto using only one second axle shaft speed sensor assembly 12 and a first speed sensor assembly 14. Both speed sensor assemblies 12, 14 can be housed in the axle housing.

Figure 2:
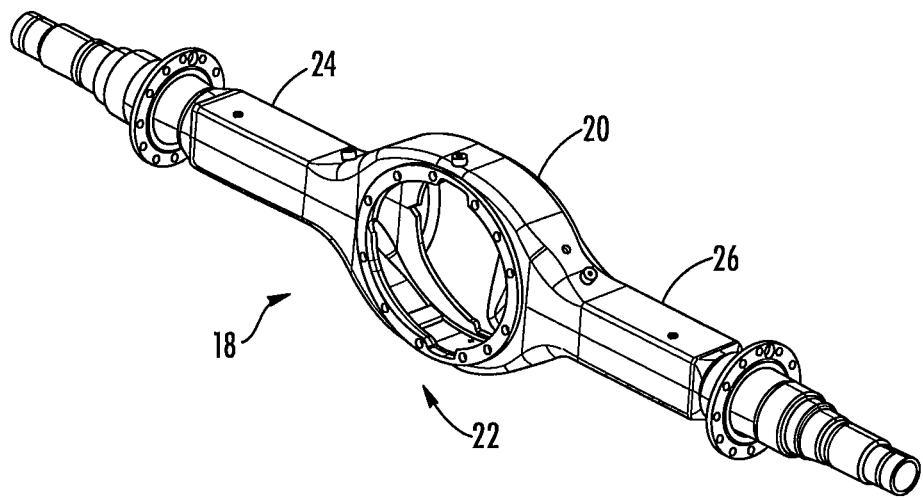
FIG. 2 shows a perspective view of one embodiment of a body assembly portion of a banjo type axle housing.

As shown in FIGS. 1 and 2, one embodiment of a small-sized or small capacity axle housing can be a banjo type axle housing. Banjo style axle housings can have two portions, a cap portion 16 and a body assembly portion 18 that are bolted together to house the differential 15 and at least some portion of the wheel axle shafts. Body assembly portion 18 can have a bulbous central area 20 that defines a cavity 22 into which at least some of the differential can be housed. In other words, cap portion 16 can rotatable support differential 15 within cavity 22. Wheel axle shafts (not shown) are connected at opposite sides of differential 15 and extend through the housing arm portions 24, 26. The bulbous central area 20 along with at least one of the housing arm portion 24, 26 resemble the shape of a banjo musical instrument.

Figure 3:
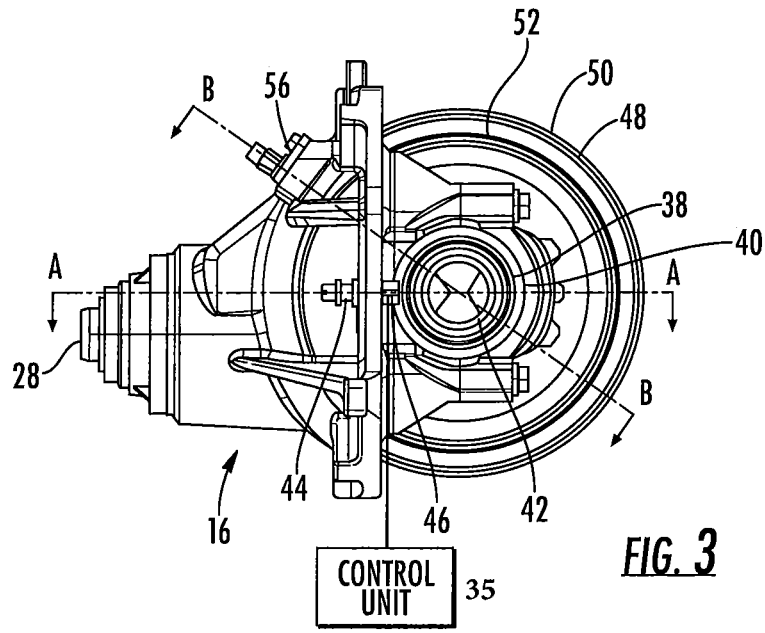
FIG. 3 shows a side elevation view of the cover portion of an axle housing and a differential having a wheel speed sensor system of FIG. 1.
Figure 4:
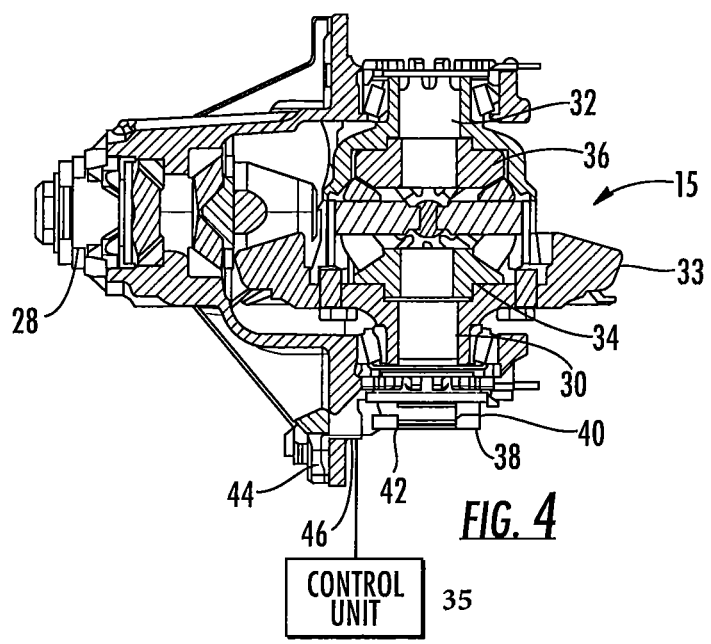
FIG. 4 shows a cross-sectional view of the cover portion of an axle housing and a differential having a wheel speed sensor system of FIG. 3 taken at line A-A.

As shown in FIGS. 3 and 4, differential 15 can have a differential gear set for imparting rotary motion from an input drive shaft 28 to the vehicle wheel axle shafts 30, 32 via at least ring gear 33 and side gears 34, 36. A first wheel axle shaft 30 can be connected to one side gear 34 and a second wheel axle shaft 32 can be connected to the other side gear 36. The first and second wheel axle shafts can extend through the arm housing 24, 26 of body assembly portion 18.

In one embodiment, the wheel axle shaft speed sensor assembly 12 and differential speed sensor assembly 14 can each include a disk or ring having teeth or slots positioned around the outer end or perimeter of the disk or ring, and a sensor capable of sensing the passing of the individual teeth (or spaces between the teeth) or slots when there is relative motion between the disk and sensor.

The sensor can be connected to a control unit 35 for calculating the rotational speed of the ring or disk or sensor depending on which component is moving. The calculation involves recording the number of teeth or slots that pass the sensor during an elapsed time divided by the number of teeth or slots on the ring or disk to arrive at a rotation per unit of time.

In the embodiment shown in FIGS. 1, 3 and 4, slotted or toothed disk or ring of the wheel axle shaft speed assembly 12 can be a tone ring 38. Tone ring 38 has a plurality of spaced apart teeth 40 around the perimeter of the tone ring 38. Tone ring 38 can have an internal bore 42 through which a wheel axle shaft 34 can extend. In one embodiment tone ring 38 can be mounted or coupled for rotation with the wheel axle shaft. In another embodiment tone ring 38 can be mounted to one of side gears 34, 36 for rotation therewith since they rotate at the same speed as the wheel axle shaft. Wheel axle shaft tone ring 38 can be positioned inside the central cavity of axle housing 16, 18.

In one embodiment, sensor mount 44 can be positioned on axle housing portion 16. Sensor 46 can be attached to sensor mount 44 and from inside the axle housing and be positioned in the cavity 22 in close proximity or directly adjacent to the outer surface or perimeter of tone ring 38. Sensor 46 can be connected to the control unit 35, In one embodiment sensor 46 can detect teeth 40 or the spacing between the teeth 40 as they pass sensor 46 with the rotation of the respective wheel axle shaft. In other words, sensor 46 generates a signal with the passing of each of the plurality of teeth 40 or spaces in between of tone ring 38. The axle shaft speed sensor assembly 12 is capable of fitting within axle housing 16, 18 without requiring the use of an additional housing or compromising the sealing between the housing of the axle assembly.

In the above embodiment the sensor 46 is mounted on a stationery portion of the axle assembly and the toothed or slotted disk or ring 38 is mounted for rotation with the wheel axle or other wheel connected component and positioned adjacent the sensor. It is understood that it is also within the scope of this disclosure that the sensor can be mounted for rotation with the wheel axle shaft or other wheel connected component and the toothed or slotted disk or ring can be fixedly mounted to the axle housing, the wheel shaft axle such as by using a bearing to prevent rotation with the axle or other stationary or fixed component.

In one embodiment, wheel axle speed sensor 46 can be a magnet or a sensor that operates on magnetism. The magnet can be a permanent or electromagnet. The plurality of teeth 40 of tone ring 38 can have magnetic properties or affect a magnetic field such as if constructed of a ferromagnetic material: As the teeth pass the magnetic sensor, variations in the magnetic field or flux produce a voltage at particular frequency. The frequency is a function of the angular velocity of the tone ring 38 and the number of teeth or slots in the ring. So for example a reading of a certain number of teeth passing per unit of time divided by the number of teeth or slots of the ring gives the angular velocity or rotations per unit time of the wheel axle shaft to which the tone ring is mounted. The calculation to determine angular velocity or rotation speed can be accomplished by the sensor or the sensor can be connected to the control unit 35 that converts the data from the sensor into rotational speed. As is understood, the rotational speed of the tone ring corresponds to or is equal to the rotational speed of the wheel shaft axle to which the ring is mounted and the wheel that is mounted to the wheel axle shaft.

Figure 5:
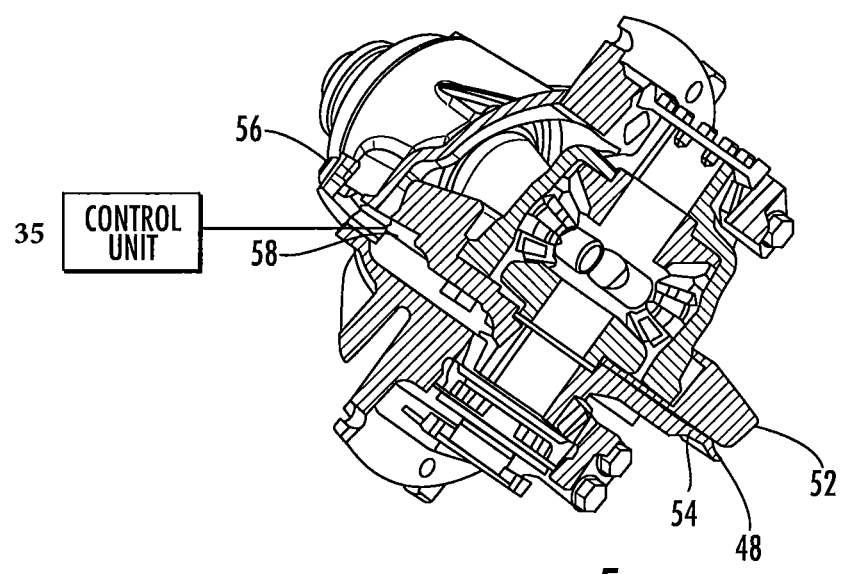
FIG. 5 shows a cross-sectional view of the cover portion of an axle housing and a differential having a wheel speed sensor system of FIG. 3 taken at line B-B.

In one embodiment of a differential speed sensor assembly 14 shown in FIGS. 1, 3 and 5, the disk or ring can be a tone ring 48. Differential tone ring 48 has a plurality of spaced apart teeth 50 around the perimeter of the tone ring 48. Differential tone ring 48 can be positioned inside the central cavity of axle housing 16, 18 and can be mounted to and coupled for rotation with ring gear 52. In particular, differential tone ring 48 can be positioned near the ring gear flange 54 of the differential assembly 15 and can be concentric with it. In one embodiment, tone ring 48 can be attached to an exterior surface of the flange 54 such as directly radially attached to the exterior surface.

In one embodiment, differential speed sensor mount 56 can be positioned on axle housing portion 16 to allow sensor 58 to attach to mount 56 and reside in axle housing portion 16 and be positioned in close proximity or directly adjacent to the outer surface or perimeter of differential tone ring 48. Differential speed sensor 58 can detect teeth 40 or the space between the teeth as they pass sensor 58 with the rotation of the respective wheel axle shaft and generate a signal. In other words, differential speed sensor 58 generates a signal with the passing of each of the plurality of teeth or space on differential tone ring 48. The differential shaft speed sensor assembly 14 is capable of fitting within the axle housing without requiring the use of an additional housing or compromising the sealing between the housing of the axle assembly.

In the above embodiment the sensor is mounted on a stationery portion of the axle assembly and the toothed or slotted disk or ring is mounted for rotation with the wheel axle or other wheel connected component and positioned adjacent the sensor. It is understood that it is also within the scope of this disclosure that the sensor can be mounted for rotation with the ring gear and the toothed or slotted disk or ring can be fixedly mounted to the axle housing, a differential gear supported with bearings to prevent rotation of the tone ring or other stationary or fixed component.

In one embodiment, the differential speed sensor 58 can be a magnet or a sensor that operates on magnetic principle. The magnet can be a permanent or electromagnet. The plurality of teeth 50 of differential tone ring 48 can have magnetic properties themselves or affect a magnetic field such as if constructed of ferromagnetic material. As the teeth pass the magnetic sensor, variations in the magnetic field or flux produce a voltage at particular frequency. The frequency is a function of the angular velocity of the differential tone ring 48 and the number of teeth or slots in the ring. So for example a reading of a certain number of teeth passing per unit of time divided by the number of teeth or slots of the ring gives the angular velocity or rotations per unit time of the differential or differential gear to which the tone ring is mounted. This calculation to determine angular velocity or rotation speed can be accomplished by the sensor or the sensor can be connected to the control unit 35 that converts the data from the sensor into rotational speed.

In another embodiment, sensors 46, 58 can operate on optical detection. In one embodiment, the optical-based sensors can detect the slots, or teeth or the spaces between the teeth as they pass. In one embodiment the sensor can be a laser that detects slots or teeth through interrupting a laser beam. An electrical signal from the sensor can be sent to the control unit 35 which records the signals over an elapsed time to determine rotational speed.

The axle shaft speed sensor assembly 12 provides the rotational speed of the first wheel axle shaft 30 to which it is connected and the wheel respectively. This wheel speed is referred to as FWS. The differential speed sensor assembly 14 provides the speed of ring gear 52 or other drive gear of the differential to which the ring or disk is connected. This differential rotational speed is referred to as DS. The differential speed DS can still be measured even if the tone ring 38 is connected to different gear of the differential as long as that gear is a drive gear and/or has not undergone a change in gear ratio such as side gear. It is known by those skilled in the art that rotational speed of the differential DS corresponds to the average rotational speed of both wheel axle shafts. Accordingly, the present two-channel wheel speed sensor system can use the rotational speed of the first wheel axle shaft 30 FWS and the rotational speed of the differential DS which is the average rotational speed of both wheel axle shafts to calculate the rotational speed of the second wheel axle shaft 32 SWS as illustrated by the equations below.

$$DS=(FWS+SWS)/2$$

$$SWS=2DS-FWS$$

Hence, the wheel speed sensor system provides the rotational speeds of both axle shafts FWS, SWS and the wheels mounted thereto using only one axle shaft speed sensor assembly and a differential speed sensor assembly.

In accordance with the provisions of the patent statutes, the present invention has been described in what is considered to represent its preferred embodiments. However, it understood that this description and the present embodiments shall not be construed in a limiting sense and that the invention can be practiced otherwise than as specifically illustrated and described without departing from the true spirit and scope of the invention which is defined by the following claims. Furthermore, it will be appreciated that any changes and modifications would be recognized by those skilled in the art as an equivalent to one or more elements recited in the following claims, and shall be covered by such claims to the fullest extent permitted by law.

The invention claimed is:

1. A wheel speed sensor system for obtaining the speed of a wheel at each end of an axle, the system comprising:
   a. a differential mounted in a banjo-type axle housing, the differential having a gear set transferring rotary motion from an input shaft to left and right wheel axle shafts for driving a wheel mounted on an end of each of the left and right wheel axle shafts;
   b. a first speed sensor assembly having a first slotted or toothed circular member and a first sensor positioned within a central cavity of the banjo-type axle housing, the first slotted or toothed circular member having equally spaced teeth or slots around an outer end of the first circular member and mounted to one of the rotating gears of the differential gear set for rotation therewith, the first sensor fixedly mounted at a position for sensing a passing of each of the teeth or slots of the first circular member and connected to a control unit for recording the passing of each of the teeth or slots over time;
   c. a second speed sensor assembly having a second slotted or toothed circular member and second sensor positioned within the central cavity of the banjo-type axle housing, the second slotted or toothed circular member having equally spaced teeth or slots around an outer end of the second circular member and mounted to one of the left and right wheel axle shafts for rotation therewith, the second sensor fixedly mounted at position for sensing the passing of each of the teeth or slots of the second circular member and connected to the control unit for recording the passing of each of the teeth or slots over time;
   d. the control unit using the passing of each of the teeth or slots of the first circular member over time to calculate a speed of rotation of the one of the rotating gears of the differential and the passing of each of the teeth or slots of the second circular member over time to calculate the speed of rotation of the one of the left and right wheel axle shafts; and
   e. the control unit calculating the speed of rotation of the other of the left and right wheel axle shafts by multiplying the speed of rotation of the one of the rotating gears of the differential by two and subtracting the speed of rotation of one of the left and right wheel axle shafts; wherein the speed of rotation of the left and right wheel axle shafts corresponds or is equal to the speed of rotation of the respective wheel mounted thereon.

2. The wheel speed sensor system of claim 1 wherein the first circular member is mounted to a ring gear of the differential gear set.

3. The wheel speed sensor system of claim 1 wherein the first and second sensors are mounted to the banjo-type axle housing.

4. The wheel speed sensor system of claim 1 wherein each of the first and second sensors is an optical sensor for detecting passing slots.

5. The wheel speed sensor system of claim 1 wherein the banjo type axle housing encloses the first and second slotted or toothed circular members.

6. A two wheel speed sensor system for obtaining the rotational speed of a wheel mounted at an end of a left wheel axle shaft and a wheel mounted at an end of a right wheel axle shaft, the sensor system comprising:
   a. a banjo-type axle housing enclosing a differential having a gear set and portions of a left and right wheel axle shafts connected to the differential;
   b. a first speed sensor assembly positioned within a central cavity of the banjo-type axle housing, the first speed sensor assembly having a first sensor and a first ring or disk including teeth spaced about the perimeter of the first ring or disk, one of the first ring or disk and the first sensor mounted on a gear of a differential gear set for rotation therewith and the other one of the first ring or disk and the first sensor fixedly mounted, the first sensor detecting a passing of each of the teeth and connected to a control unit, the control unit recording output of the first sensor over time to calculate a speed of rotation of the gear of the differential gear set (DS);
   c. a second speed sensor assembly positioned within the central cavity of the banjo-type axle housing, the second speed sensor assembly having a second sensor and a second ring or a disk including teeth spaced about the perimeter of the second ring or disk, one of the second ring or disk and the second sensor mounted on one of the wheel axle shafts for rotation therewith and the other one of the second ring or disk and the second sensor fixedly mounted, the second sensor detecting a passing of each of the teeth and connected to a control unit, the control unit recording output of the second sensor over time to calculate a speed of rotation of one of the wheel axle shaft (FWS);
   wherein each of the first and second rings or disks of the first speed sensor assembly and the second speed sensor assembly is a tone ring including teeth having magnetic properties and each of the first and second sensors of the first sensor assembly and the second speed sensor assembly operates by sensing the magnetic properties of the respective teeth that produce a voltage when the teeth of the tone ring pass each of the sensors; and
   wherein the control unit calculates a speed of rotation of the other one of wheel axle shafts (SWS) using the following formula: SWS=2DS−FWS, and wherein the speed of rotation of the wheel axle shafts is equal to the speed of the respective wheel.

7. The two wheel speed sensor system of claim 6 wherein the first ring or disk of the first speed sensor assembly is mounted to a ring gear of the differential gear set and positioned inside the banjo-type axle housing.

8. The two wheel speed sensor system of claim 6 wherein the first ring or disk of the first speed sensor assembly is mounted to a side gear of the differential gear set and positioned inside the banjo-type axle housing.

9. The two wheel speed sensor system of claim 6 wherein the second ring or disk of the second speed sensor assembly is mounted to one of the wheel axle shafts inside the banjo-type axle housing for rotation therewith.

10. A method of determining the rotational speed of a first wheel mounted at one end of an axle and a second wheel mounted at an opposite end of the axle, the method comprising:
   a. attaching a first slotted or toothed ring or disk to a gear of a differential gear set and positioned in the banjo-type axle housing;
   b. attaching a first sensor to a stationary component and positioned adjacent to the slotted or toothed portion of the first ring or disk and in a central cavity of the banjo-type axle housing, the first sensor capable of sensing a passage of each of the slots or teeth of the first ring or disk;
   c. attaching a second slotted or toothed ring or disk to a rotatable portion of a second wheel axle shaft and positioned in the central cavity of the banjo-type axle housing;
   d. attaching a second sensor to a stationary component and positioned adjacent the slotted or toothed portion of the second ring or disk and in the central cavity of the banjo-type axle housing, the second sensor capable of sensing a passage of each of the slots or teeth of the second ring or disk, wherein the teeth of the first and second rings or disks have magnetic properties and the first and second sensors operate by sensing changes in a magnetic field or flux that produce a voltage when the teeth of the first and second rings or disks pass the first and second sensors;
   e. connecting the first and second sensors to a control unit for recording the passage of slots or teeth of the first and second rings or disks per unit of time to calculate a speed of rotation of the first wheel axle shaft referred to as FWS and a speed of rotation of the gear of the differential gear set referred to as SD; and
   f. calculating the speed of rotation of a second wheel axle shaft referred to as SWS according to the following formula: SWS=2SD−FWS, wherein the speed of rotation of the first wheel axle shaft and the second wheel axle shaft is equal to the speed of rotation of the first wheel and second wheel, respectively.

11. The method of claim 10 wherein the first ring or disk is mounted to the ring gear of the differential gear set.

12. The method of claim 10 wherein the first and second sensors are mounted to the banjo-type axle housing.

13. The method of claim 12 wherein the first and second sensors are accessible from the outside of the banjo-type axle housing.

* * * * *